Oct. 30, 1951     P. PEVNEY     2,572,947
TRANSPARENT PANEL CONSTRUCTION AND MOUNTING
Filed Jan. 24, 1944     3 Sheets—Sheet 1
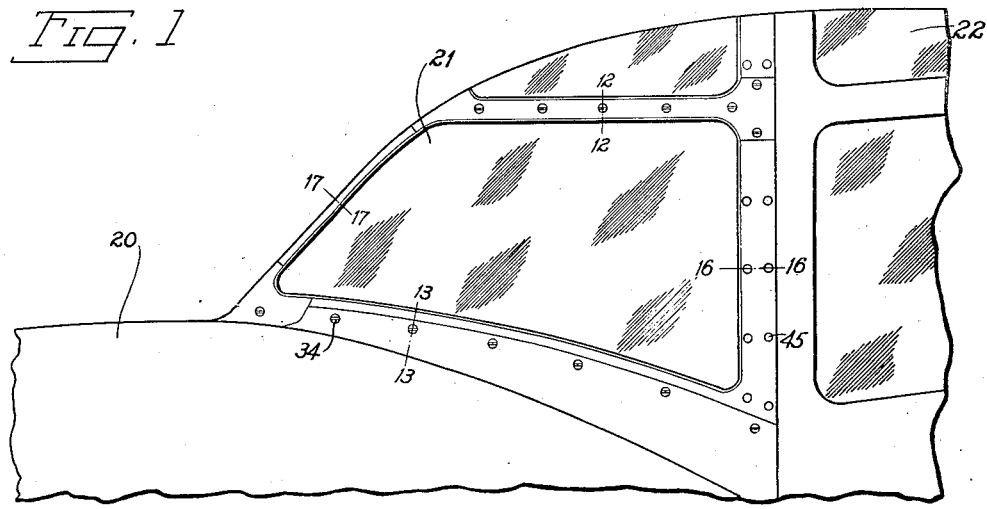
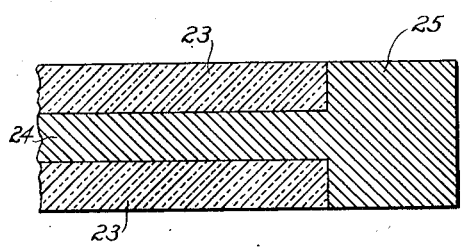
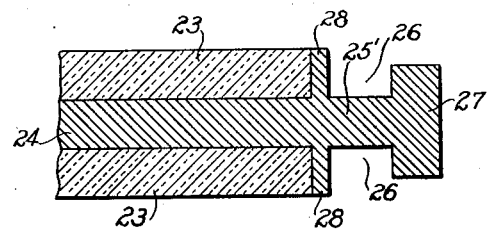
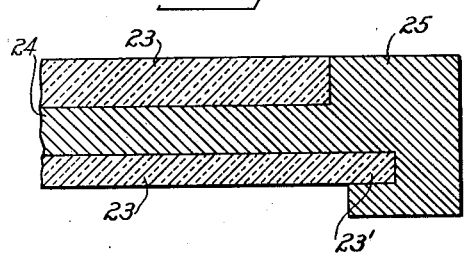
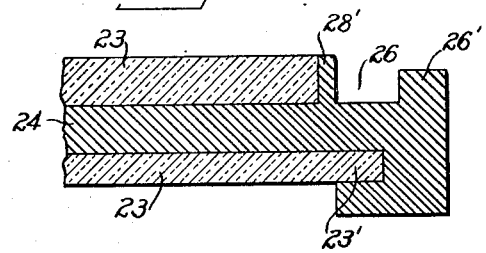
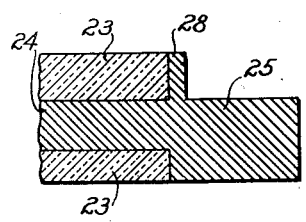
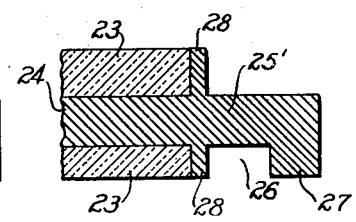
INVENTOR.
PAUL PEVNEY
BY Charles S. Wilson
ATTORNEY.

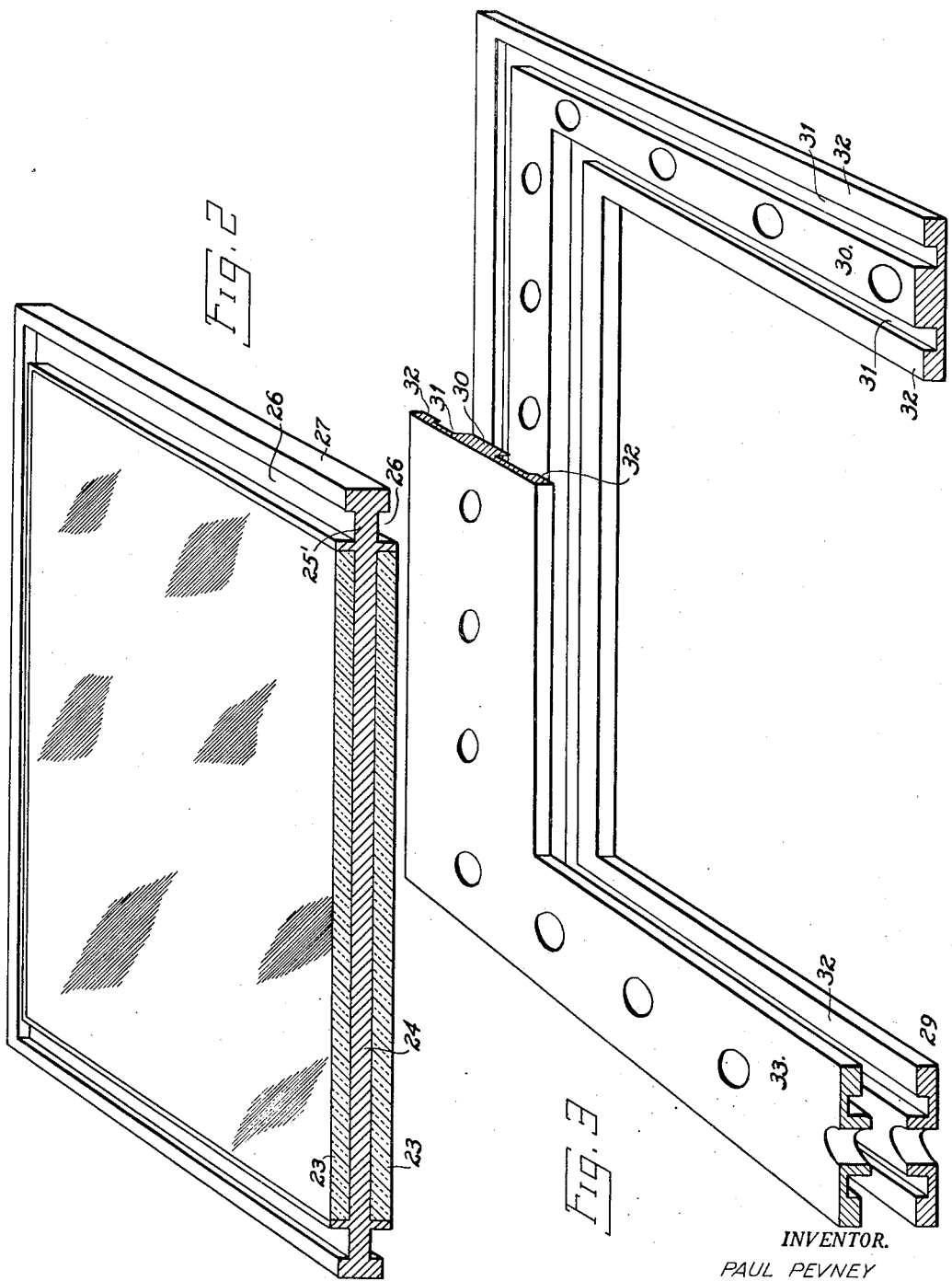

Oct. 30, 1951 P. PEVNEY 2,572,947
TRANSPARENT PANEL CONSTRUCTION AND MOUNTING
Filed Jan. 24, 1944 3 Sheets-Sheet 3

INVENTOR.
PAUL PEVNEY
BY Charles S. Nelson
ATTORNEY.

Patented Oct. 30, 1951

2,572,947

UNITED STATES PATENT OFFICE 2,572,947

TRANSPARENT PANEL CONSTRUCTION AND MOUNTING

Paul Pevney, Nassau Shores, N. Y., assignor to Republic Aviation Corporation, a corporation of Delaware Application January 24, 1944, Serial No. 519,459

7 Claims. (Cl. 189—64)

This invention relates to transparent panel constructions and the mountings therefor, and especially to a panel construction incorporating a series of glass sheets bonded together by plastic interposed between them.

The panel construction and mounting forming the subject matter of the instant invention contemplates a laminated panel or sheet consisting of alternate layers of glass and plastic bonded together and mounted in a supporting frame structure without contact between the glass and any part of the frame structure and with no fastening or securing means such as clamps, bolts, rivets, etc. piercing or passing through any part of either the plastic or the glass layers.

The present invention proposes a continuous clamping structure having unbroken engagement with the edge portions of the transparent panel unit in such manner that a fluid tight seal is provided and maintained at and along each edge of each panel regardless of the character or nature of the structure to which it is secured.

With the above and other objects in view, as will be apparent, the invention consists in the construction, combination and arrangement of parts, all as hereinafter more fully described, claimed and illustrated in the accompanying drawings, wherein:

Fig. 1 is a fragmentary side elevation of the windshield and canopy of an aircraft illustrating the present invention applied thereto:

Fig. 2 is a perspective view, partly in section, of a single transparent panel constructed in accordance with the present invention, illustrating the marginal edge formation.

Fig. 3 is a fragmentary perspective view, partly in section, of a pair of frame members which engages the marginal edge portions of a panel showing them separated for the reception of said edge portions therebetween:

Fig. 4 is a sectional view through the marginal portion of a panel constructed in accordance with the present invention prior to any working or forming thereof:

Fig. 5 is a similar view illustrating the construction shown in Fig. 2 after its marginal portion has been worked or formed:

Fig. 6 is a view like Fig. 4 of a modified construction of the panel showing it prior to the working or forming of its marginal portion:

Fig. 7 is a view similar to Fig. 5 illustrating that form of the present invention disclosed in Fig. 6 after its marginal portion has been worked or formed:

Fig. 8 is a view like Figs. 4 and 6 of a still further modified form of the present invention:

Fig. 9 is a view like Figs. 3 and 5 showing that form of the invention illustrated in Fig. 8 after its marginal portion has been worked or formed:

Figure 10:
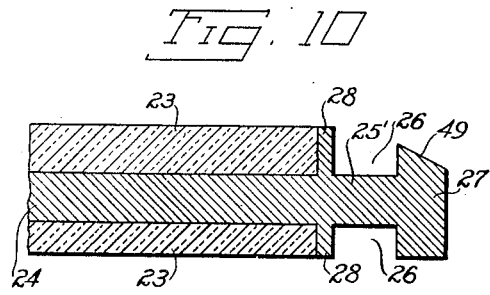
Figs. 10 and 11 are fragmentary sectional views of other modified forms of the present panel construction showing the marginal portion of each worked and formed.
Figure 11:
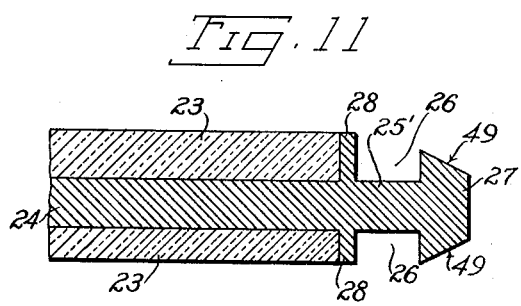
Figure 17:
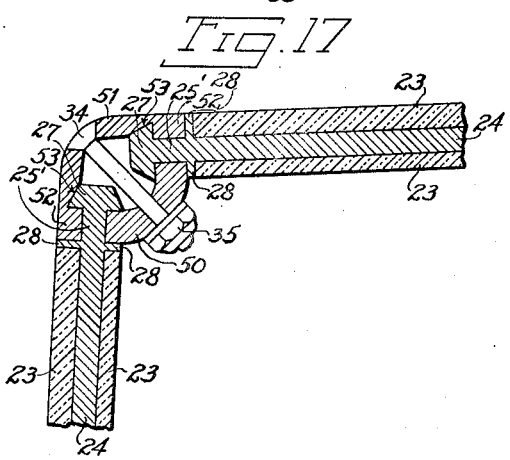
Figure 18:
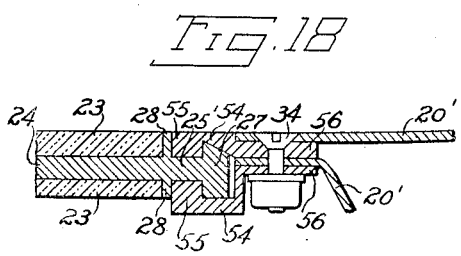

Fig. 17 is a sectional view taken along line 17—17 of Fig. 1 showing the mounting and inter-connection of two angularly disposed transparent panels, as sometimes occurs in a windshield, employing that form of panel construction illustrated in Fig. 11: and Fig. 18 is a sectional view disclosing a modified form of mounting to secure a panel of the form disclosed in Fig. 10 in and to a fixed frame structure.

The present invention is designed to provide a transparent panel construction which is non-shatterable and at the same time particularly adapted for use in defining enclosures where extreme pressures and operating conditions are encountered, as for example in the cabins of high altitude aircraft, where in the event the cabin is pressurized the pressure within the cabin frequently exceeds the exterior or atmospheric pressure. Not only is the present invention designed to withstand a wide differential in pressures but the structure to and by which the panel is mounted in place in the windshield or canopy of the aircraft is such that it has continuous sealing engagement with the panel at all marginal or edge points whereby the joints at the edges of the panel are fluid or air-tight.

Since all of the panels herein contemplated are secured by and mounted at their margins, it is proposed that a continuous, unbroken fluid tight seal be provided at each edge of each panel and that no part of the panel be pierced by any element or part of the securing or mounting means.

In order to present the smooth, unbroken exterior surface required in aircraft and thereby avoid any modification of the aerodynamic design, no projections of any kind are presented and the exterior faces of the panels and of the mounting and securing means coacting with them as well as the surfaces of any adjoining panel structures lie in the same plane or on the same curve.

The several modifications illustrated in the drawings and hereinafter specifically described are essentially for the purpose of meeting variations in the construction of the windshield and/or canopy of an aircraft or other supporting or closure construction, but it is to be understood that any one of these modifications may be employed with equal facility wherever the structural limitations of the suupporting frame or structure permit. In the several modifications, as will be hereinafter pointed out, practically all structural conditions arising in the windshield or canopy of an aircraft, as for instance two angularly disposed panels connected together at their adjoining ends (Fig. 17), or a curved frame connecting to the edge of a panel (Figs. 13 and 15), or a curved panel construction connecting a relatively flat panel construction (Figs. 12 and 14), or a curved panel construction connecting with a frame construction (Fig. 16), or a relatively flat panel construction connecting with a relatively flat frame contruction (Fig. 18). While the instant invention is especially intended for use in the canopy and windshield of an aircraft and particularly in an aircraft having pressurized cabin, it may as readily be employed wherever a laminated transparent panel is mounted in or secured to a frame structure e. g. windows or the windshield of an automobile.

As an example of one adaptation and use of this invention it is illustrated and will be described in conjunction with the canopy and windshield of an aircraft and in the drawings, 20 designates the fuselage, 21 the windshield, and 22 the canopy coacting with the windshield and the fuselage to define the aircraft cabin. In the type of aircraft with which the present invention is especially designed to cooperate, the interior of the cabin defined by the windshield 21 and the canopy 22 has, or is under, far greater pressure than the surrounding exterior atmosphere under certain operating conditions. In short, the cabin or enclosure receives air under pressure to maintain the pressure therein at the equivalent of atmospheric pressure at a determined altitude—for example, 10,000 feet—and this internal pressure is maintained regardless of any further altitude attained by the aircraft. Thus it is quite possible that the interior pressure of the cabin may be as much as four times that of the atmospheric pressure on the exterior thereof. This differential in pressure results in great stresses and strains upon the panels combining to create the windshield 21 and the canopy 22 and encloses the cabin and requires a fluid tight joint between the panels and the cooperating frame or supporting structure to prevent leakage of the pressure maintained within the cabin. To this end a novel panel construction is employed and continuous clamping members sealingly engage each margin of each panel and secure it to its supporting frame structure.

The panel construction incorporated in and forming a part of the present invention consists, in all forms of the invention, of two or more sheets of glass 23 separated and bonded together by the plastic sheet or sheets 24 interposed therebetween. The plastic forming the sheet 24 may be of any suitable standard type, available upon the open market, having the ability to act as a bond for the glass sheets 23 and having sufficient rigidity and workability to be routed, shaped or formed for mounting purposes as will be described. In addition to these characteristics it is desirable for the plastic to possess a degree of compressibility and flowability so that the mounting fixtures or clamping members may partially embed therein in engaging the plastic for the mounting of the panel. A plastic to meet these requirements may be one of the synthetic resins, particularly of the vinyl group, as for example poly vinyl butyral. Acetal plasticized with dibutyl sebacate has been found to satisfactorily meet the requirements of this invention.

One of the distinguishing characteristics of the instant panel construction, which is present in all modifications thereof, is the extension of the plastic layer or sheet 24 beyond the limits of the glass sheets 23. This extension of the plastic layer or sheet 24 produces a block 25 at the edges of the panel having a thickness at least equal to the combined thicknesses of the several glass and plastic layers or sheets 23—24 which combine to create the panel and coextensive with all of the edges of the spaced glass layers or sheets 23.

Figs. 4 and 5 illustrate one form of the panel construction wherein the plastic sheet 24 extends beyond the limits of the glass sheets 23 to create the block 25 integral with the plastic sheet 24 and substantially as thick as the combined thicknesses of the glass sheets 23 and the plastic sheet 24. In this form of the invention the block 25 is wholly beyond the limits of the glass sheets and in Fig. 5 is illustrated its form or construction after being worked or shaped for mounting purposes. Here a groove 26 is provided upon each side of the block, parallel to the edges of the glass sheets 23, creating a head 27 at the outer side of the block and a flange 28 adjacent and lying flush against each edge of the glass sheet 23 whereby the grooves 26 are separated from the edges of the glass sheets 23 and the latter are cushioned by the flanges 28. The opposed and aligned grooves 26 reduce the thickness of the block 25 medially of its width thereby producing the neck 25' between the heads 27 and the flanges 28. To establish at least one continuous, unbroken surface, preferably the exterior surface, between the panel and its supporting and engaging structure as will be described, the head 27 is not as thick as the block 25 from which it is formed nor is it as thick as the combined depths of the flanges 28. As disclosed in Figs. 12 and 13, this permits the engagement of the plastic extension at the edges of the panel by the clamping frame without any part of the panel or of the clamping frame projecting beyond the plane of the surface of the outer glass sheet 23.

The form of panel construction shown in Figs.

Figure 12:
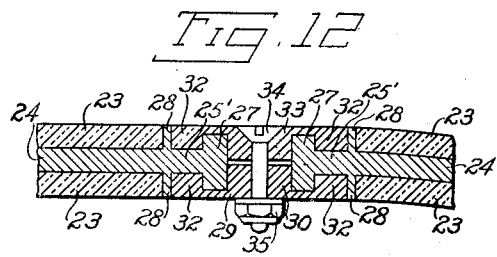
Fig. 12 is a sectional view taken along line 12—12 of Fig. 1 through parts of adjoining panels constructed according to the teachings of this invention connected one to the other by a continuous clamp coacting with a frame member, the panel construction being particularly that shown in Fig. 5.
Figure 13:
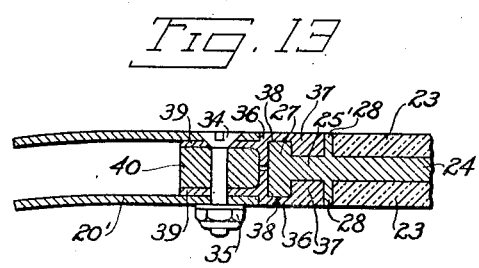
Fig. 13 is a similar view taken along line 13—13 of Fig. 1 through a single panel connected and secured to a part of a frame structure, such, for example, as a fuselage.

4 and 5 is further illustrated in Figs. 2, 12 and 13. In Figs. 12 and 13 are disclosed the frame and clamping structures by which this type or form of panel may be mounted: Fig. 12 illustrating two identical panel constructions connected one to the other and Fig. 13 illustrating the panel attached and secured to a metallic frame or body, e. g. part of the fuselage 2. A frame element 29 is interposed between the two panels and connects at its ends to the frame of the windshield 21 or other fixed part in any suitable or desired manner. For the present purposes it is sufficient to note that the frame element 29 constitutes a part of the general frame structure to which the transparent panels are to be attached. In the present embodiment, used for illustrative purposes, the frame element 29 is part of the general permanent framework of the windshield or other fixed part of an aircraft but it can be part of any other framework in which it is desired to mount transparent panels of the present type. This frame element 29 is provided with a central longitudinal boss 30 upon each side of which is a groove 31 defined by a ridge or longitudinal rib 32 at the edge of the frame element and substantially parallel to the boss. One side of the head 27 of each panel is received in one of the grooves 31 in such manner that the body or neck 25 of the block between the flanges 28 and the head 27 rests upon the surface of the ridge or rib 32. A clamping plate member 33, substantially a duplicate in cross section of the frame element 29 (in that it too has a central longitudinal boss 30 flanked by grooves 31 and the longitudinal ridges or ribs 32) engages over the outer ends of the head 27 with its ridges or ribs 32 flanking the grooves 31 seated in the grooves 26 defined by the head 27 and the flanges 28. In short the plastic head 27 of the panel is engaged in the complementary grooves 31 of the members 29 and 33 and the opposed ribs or ridges of the members 29 and 33 are received in the opposed grooves 26 of the plastic extension to grip and clamp the neck 25' between their edges. In so clamping the neck 25' the ribs or ridges 32 may more or less embed therein, to create a fluid tight seal between the neck 25' and the edges of said ribs or ridges. When this occurs the outer surface of the clamping member 33 is flush or coplanar with the outer surface of the outer sheet 23 so that a continuous unbroken surface is created. It will be observed that the necks 25' as well as the heads 27 formed thereon of a pair of connected panels are separated one from the other by the longitudinal bosses 30 on the elements 29 and 33 and that the ribs or ridges 32 of the latter are received between the flanges 28 and the heads 27 of the extensions of the plastic layers 24 thereby being retained from any contact with the edges of the glass sheets 23 upon either side of the frame structure consisting of the coacting members 29 and 33.

In order to secure the clamping member 33 to the frame element 29, the longitudinal bosses 30 of both of these elements are pierced at intervals by registering openings for the reception and passage of the bolts 34, the heads of which are countersunk in the outer face of clamping member 33 so that they rest flush with the surface thereof and the inner ends of which are provided with the nuts 35. By adjusting the nuts 35 on the bolts 34 the pressure exerted by the ribs or ridges 32 of the clamping member 33 upon the necks 25' and of the clamping pressure between the members 29 and 33 may be regulated and uniformly distributed throughout the projecting marginal plastic edge of the panel. However, in doing this the bolts 34 do not pass through any part of the plastic extensions but on the contrary pass through the longitudinal bosses 30 disposed between these heads 27. Thus there is no weakening of the structure of the plastic layer 24 extending beyond the limits of the glass sheets nor is even the clamping pressure of the clamp 33 imparted to the glass as it is taken up entirely by the projecting plastic marginal edge portion of the panel.

In Fig. 13 a somewhat modified use of that form of the panel construction shown in Fig. 5 is employed. Here the frame 20' constitutes a part of the fuselage structure 20 or part of its construction. Two complemental clamping members 36 each having the coextensive rib or tenon 37 at its outer edges and grooves 38 parallel and adjacent thereto are provided for the engagement and mounting of the panel. When the formed block 25 of the panel construction is engaged between the clamping members 36 the tenons or ridges 37 of the clamping members enter and engage in the grooves 26 thereof while the ends of the head 27 of the panel are received in the grooves 38 of the clamping members 36. It will be noted that the tenons or ridges 37 of the clamping members 36, when so engaging the panel, are separated from the edges of the glass sheets 23 by the flanges 28 which cushion the edges of the glass sheets and protect them from direct contact with the metal of said members. Opposed to the ridges or tenons 37 the clamping members 36 are provided with the parallel tail pieces 39 separated by a spacer 40. The spacer 40 and tail pieces 39 are inserted between the elements making up the frame structure 20' and the whole is pierced by the bolts 34 having the nuts 35 upon the interior face of the frame structure 20'. Thus if the nuts 35 are tightened upon the bolts 34 the clamping pressure between the bosses or ridges 37 and the plastic extension and head 27 of the panel is increased, clamping the panel construction to the metallic frame 20'. It will also be seen that the fastening bolts 34 do not in any manner pass through or pierce any part of the panel construction, either glass or plastic.

Figs. 12 and 13 illustrate two forms of mountings and clamps to be employed in receiving the panel construction shown in Fig. 5 in and to a suitable supporting frame, the member 29 in Fig. 12 and the frame 20' in Fig. 13.

In Figs. 6 and 7 is shown a somewhat different panel construction. This form of the invention has the block 25 extending beyond the edges of both of the glass sheets 23 as in the other modifications of the invention but also one of the glass sheets 23 extends, as at 23', beyond the edges of the companion sheet 23 and is embedded in and surrounded by the plastic block 25. One side of this block 25 is provided with a groove 26 creating a flange or rib 26' at the outer edge of the block and a flange 28' at its inner end resting flush against the outer end of the smaller glass sheet 23. The projecting end 23' of the larger glass sheet 23 extends to a point below the groove 26'.

Figure 14:
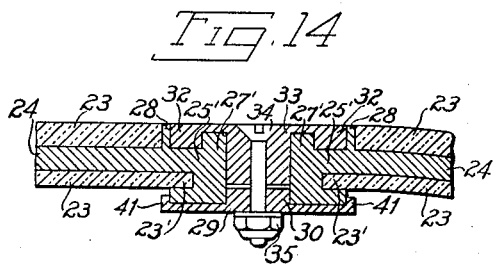
Fig. 14 is a view similar to Fig. 12 employing the form of panel construction shown in Fig. 7.
Figure 15:
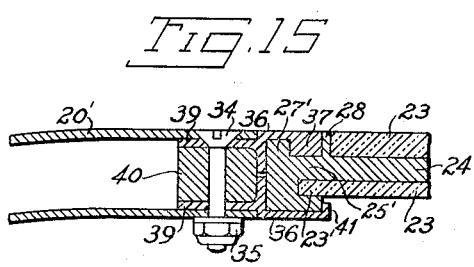
Fig. 15 is a view similar to Fig. 13 employing that form of panel construction shown in Fig. 7 and demonstrating the attachment thereof to a fixed member or frame structure, such, for example, as a fuselage.

Figs. 14 and 15 illustrate the manner in which that form of the panel construction shown in Fig. 7 is mounted in a frame structure or whereby two panels constructed as in Fig. 7 may be connected one to the other. Aside from dimensions and proportions the mountings and clamping members employed in Figs. 14 and 15 are substantially identical with the same elements used in Figs. 12 and 13. In Fig. 14 the frame element 29 has a boss 30 which enters between the heads 27' of the adjoining projecting marginal portions of the plastic layers 24 and separates them and at each edge is provided with a flange 41 lapping over and engaging that portion of the block 25 in which the extension 23' of one of the glass sheets is embedded. The clamping member 33 in Fig. 14 is identical with the clamping member 33 of Fig. 12 except that the central or longitudinal boss 30 has a greater depth. Bolts 34 removably and adjustably secure the clamping member 33 to the frame element 29 as in Fig. 12 and the longitudinal ribs or ridges 32 of the clamping member 33 are seated in the grooves 26 to the rear of the heads 27' of the marginal plastic extensions of the panel to clampingly grip the necks 25' against the frame element 29. In Fig. 15 the inner clamping member 36 lies flush against the face of that part of the block 25 in which the glass extension 23' is embedded and has the flange 41 against the inner side thereof in the manner of the same flanges in Fig. 14. As in that form of the invention disclosed in Fig. 13, the clamping member 36 engages over the head 27' of the plastic extension of the panel with its ridge or tenon 37 seated in the groove 26 and bearing on and against the neck 25'. The function, construction and mounting of the tail pieces 39 and spacer in Fig. 15 is the same as in Fig. 13.

Figure 16:
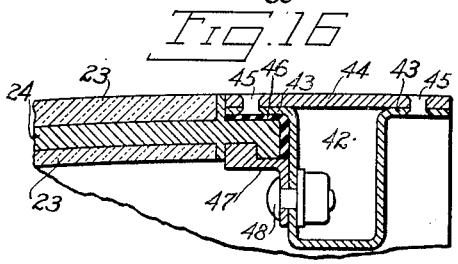
Fig. 16 is a section taken along line 16—16 of Fig. 1 to illustrate the mounting of the present panel in a frame structure, such as a canopy frame, employing that form of panel construction shown in Fig. 9.

Fig 16 demonstrates the use of that form of panel construction shown in Fig. 9 as applied to a stationary frame-piece such as a hinge post 42. This post 42 is a fixed strut or post and is provided with the flanges 43 extending in opposite directions upon each of its longitudinal sides. A plate 44, which may be skin of the fuselage 20, is secured to the outer surface of the flanges 43 by the countersunk rivets 45 passing through the plate 44 and the flanges 43. This plate 44 rests flush with or forms a part of the outer surface of the structure and therefore forms a continuation of the surface of the outer glass sheet 23 of the panel. The panel construction employed in this form of the invention has the projecting marginal portion 25 of the plastic sheet 24 provided in one surface with the groove 26 creating the flange 28 (which is duplicated on the opposite side of the marginal portion 25) and the head 27 located only on one side of the longitudinal axis of the porition 25. Thus the structure of the panel is such that the projection 25 of the plastic layer 24 is co-planar with one surface of the plastic layer or sheet and has the head 27' on its opposite side lying in the approximate plane of the outer surface of the glass sheet 23 aligned with that side of the plastic margin, this side of the projecting marginal portion of the plastic being also provided with the groove 26. On both sides of the projecting marginal portion 25 of the plastic sheet are the flanges 28 resting flush against the adjacent edges of the glass sheets 23. In assembling, the straight side or ungrooved side of the marginal edge portion 25 is positioned adjacent the flange 43 of the post 42 and is separated therefrom by the filler 46 which may be rubber or any other suitable material. When so positioned the outer surface of the panel forms a continuation of the outer surface of the plate or skin 44 and lies in substantially the same plane or upon the same curve as the latter. L-shaped locking or clamping members 47 co-extensive with the post 42 are bolted at intervals to the post as at 48 and are provided on one arm with a rib or tenon 50 to be received in the groove 26 of the panel construction. In this manner the panel construction is secured and sealingly clamped to the post without any bolts or other fastening means piercing any part thereof and with a fluid tight seal between the plastic of the panel and the elements of the post, the edges of the glass being at all times and points cushioned by the flanges 28 of the plastic 24.

Fig. 17 illustrates a windshield, employing that form of panel construction disclosed in Fig. 11, the two parts A and B of the windshield 21, each constituting a single panel unit, disposed angularly one to the other with their adjoining edges secured together and clamped in a fluid tight manner. The panel construction shown in Fig. 11 is substantially identical to that disclosed in Fig. 5 except that the end edges 49 of the head 27 converge in a direction away from the panel unit and the outer sheet of glass 23 is appreciably thicker than the inner glass sheet 23. An arched frame piece 50 is positioned at the line junction of the panels A and B with its edges seated in the grooves 26 of the pair of panels. A clamping member 51, oppositely bent or arched, is disposed upon the exterior of the junction between the panels A and B and is provided with longitudinal ribs or tenons 52 at its edges to be seated in the grooves 26 opposed to the similar grooves in which the edges of the frame piece 50 are received. For the accommodation of the sloping end edges 49 of the heads 27 of the panels, grooves 53 are formed in the inner surface of the clamping member 51 adjacent and substantially parallel to ribs or tenons 52 and the bottom surface of each of these grooves slopes upwardly and inwardly at the same angle as the ends 49 of the head 27. Bolts 34 with their heads countersunk in the outer surface of the clamping member 51 pass through said clamping member 51 and the frame section 50 at intervals, the heads 35 of the bolts operating against the frame section 50. In this manner the tightening of the nuts 35 upon the bolts 34 draws the clamping member 51 toward the frame section 50 thereby exerting a clamping pressure between the edges of the frame piece 50 and the ribs or tenons 52 upon the clamping member 51, this pressure being only exerted on the plastic and the frame piece and clamping member being separated by the plastic flanges 28 from the edges of the glass sheets 23.

Fig. 18 discloses a still further modified form of the present invention utilizing that form of panel construction shown in Fig. 10. The mounting in this form of the invention is similar to the constructions shown in Figs. 13 and 15 in that the frame section 20' secured to the transparent panel instead of having its elements parallel as shown in Figs. 13 and 15, has the inner side 20'' bent inwardly and resting in close proximity but spaced from the outer side. The panel as shown in Fig. 10 and in Fig. 18 is provided with a relatively thick glass sheet and a relatively thin glass sheet so that the plastic sheet 24 does not lie on the center line through the panel. The head 27 of the projecting portion of the plastic sheet 24 is created by a relatively shallow groove 26 on one side where the edge of the head 27 rests in the plane of the outer surface of the inner glass sheet 23; while the opposite or sloping edge 49 of the head 27, created by the aligned groove 26, is angularly disposed to the plane of the outer surface of the other glass sheet 23. Clamping members 54 provided with the ribs or tenons 55 are seated in the grooves 26 of the projecting portion of the plastic sheet or layer 24 of the panel construction thereby gripping the neck 25' and are provided with grooves in their inner surfaces corresponding in shape to the shape of the respective and cooperating edges of the head 27 for the reception of the latter. Each clamping member 54 is provided with a tail piece 56, the tail piece 56 of one clamping member being received between the wall section elements 20'—20" while the companion tail piece 56 rests against the surface of the wall element 20". A bolt 34 countersunk in the outer wall element 20' passes through the outer wall element 20', the two tail pieces 56, the inner wall 20", and is held in place by the nut 35 operating against the inner surface of the inner wall element 20". The tightening of the nut 35 upon the bolt 34 causes the clamps 54 to move toward one another gripping the neck portion 25' of the plastic layer 24, thereby creating a fluid tight seal for the panel construction mounting.

While the plastic which binds the glass sheets 23 together forms per se no part of the invention, it is contemplated and proposed to take advantage of its characteristics, particularly in the engagement of the projecting marginal portions by the several types of clamping members and frame pieces herein described. Many synthetic resins suitable to function in the present invention are available commercially on the open market. It is desirable to have a plastic which has a great tensile strength, some flexibility, flowability and compressibility. Since no part of the clamping and mounting structure pierces the plastic or any part of the panel, no great torsional strains or stresses are set up in the panel so that they do not have to be resisted by either the glass of the panel construction or by the plastic. The desirability of some degree of flowability and compressibility is apparent when it is appreciated that the ribs or tenons of the several clamping members and frame pieces are received in the grooves 26 of the projecting portions of the plastic and create, together with the flanges 28 and the head 27, fluid-tight seals between the clamp and the plastic. If the plastic has a flowable or compressible nature the clamping ribs or tenons may embed therein to some degree thereby adding to the fluid tight nature of the seal. This is not necessary or essential to the present invention since the structure herein described, independently of any compressibility or flowability of the plastic, creates a practical air-tight seal between the frame structure and the panel.

The frame elements heretofore described, such as the elements 29, 36, 42, 50 and the like, are part of a fixed frame structure and may be secured one to the other and to the fuselage 20 of the airplane as becomes manifest from Fig. 1. The clamping members, such as the elements 33, 36, 47, 51 and 55 are removable and separable from the cooperating frame pieces, and this is also apparent from a consideration of Fig. 1. The manner in which the frame pieces aforesaid are secured to each other, or are attached to the fuselage 20 of the aircraft or other structure, forms no part of the present invention and therefore is not illustrated or described. The essence of the present invention resides in the panel construction and the cooperation thereof with clamping members, and in the construction of the clamping members and frame elements, regardless of how they may be mounted or supported.

What is claimed is:

1. A transparent panel of laminated safety glass comprising at least two layers of glass bonded to an interlayer of transparent synthetic resin, an extension of said interlayer projecting beyond the edges of the glass layers to form a mounting margin of synthetic resin, relatively thin flanges formed integrally with the mounting margin and projecting laterally from the opposed faces thereof to overlie and rest flush against the adjacent edges of the glass layers, and a head formed integrally with and at the outer edge of said margin to project laterally beyond each face of the margin in spaced and substantial parallel relationship to the flanges aforesaid.

2. A panel of laminated safety glass comprising two glass layers bonded to an interlayer of synthetic resin, an extension of said interlayer projecting beyond the edges of the glass layers to form a mounting margin of synthetic resin, relatively thin flanges formed integrally with said mounting margin to project laterally from the opposed surfaces thereof and rest flush against and completely cover the edges of the glass layers, and an integral head disposed along the outer edge of said margin to project laterally from and beyond the opposed surfaces thereof, said head being spaced from and positioned substantially parallel to said flanges and having an overall thickness less than the combined thicknesses of the glass layers and the resin interlayer.

3. The combination with a panel of safety glass consisting of two layers of glass bonded to an interlayer of synthetic resin, an extension of said interlayer projecting beyond the limits of the glass layers to form a mounting margin, integral flanges projecting laterally from said margin to rest flush against and completely cover the edges of the glass layers, and a lateral head integral with the outer edge of said margin and spaced from said flanges, of a frame member to coact with one face of the said margin, a clamping member to coact with the opposite face of said margin, said members each having a lateral tenon to be seated between the flange and head of the margin, at least one boss integral with one of said members and intermediate of the tenons on said member whereby part of the head may be positioned between the boss and each tenon, and means for securing said boss and members together in substantial abutment to clampingly and fixedly engage the mounting margin between said members.

4. The combination with a panel of safety glass consisting of two layers of glass bonded to an interlayer of synthetic resin, an extension of said interlayer projecting beyond the limits of the glass layers to form a mounting margin, flanges integral with said mounting margin and projecting laterally therefrom to rest flush against and completely cover the edges of the glass layers, and a head integral with and projecting from each side of the outer edge of said margin in spaced relation to said flanges, said head having a maximum thickness less than that of the panel, of a frame element to coact with one face of the margin, a clamping member to coact with the opposite face of the margin, said frame element and clamping member each having a lateral tenon to be seated between the flange and head of the margin and each of said member and element having an integral boss spaced from the tenon to rest against the outer face of the head with the end portions of the head disposed between the bosses and the tenons and bearing at their extremities against the inner surfaces of the element and member whereby the outer face of the latter rests in the same plane as the corresponding outer face of the panel, and means for securing the bosses of said element and member together in substantial abutment and thereby clampingly and fixedly engage the mounting margin between the frame element and the clamping member.

5. The combination with at least two panels of safety glass so organized and arranged that one constitutes an approximate continuation of the other, each panel consisting of two glass layers bonded by an interlayer of synthetic resin projecting beyond the edges of the glass layers to form a mounting margin, said mounting margin having integral flanges projecting from opposite faces thereof to rest flush against and completely cover the edges of the glass layers and an integral head disposed along its outer edge portion to project laterally from both sides of the mounting margin in spaced relationship to said flanges whereby to establish transversely aligned grooves upon opposite sides of said margin, of a frame element adapted to span the adjoining margins of said panels and having lateral tenons at its edges to be seated in the grooves of corresponding faces of said margins and an integral longitudinal boss centrally disposed between and spaced from said tenons thereby creating a groove on each side of the boss for the reception of the heads on corresponding sides of the margins, a clamping member having lateral tenons at its edges to be seated in the grooves of the opposite faces of said mounting margins and an integral longitudinal boss centrally disposed between and spaced from said tenons thereby creating a groove on each side of the boss for the reception of the heads on the opposite side of the margins, and means for securing the bosses of the frame element and clamping member one to the other thereby clampingly engaging the mounting margins of the panel between the tenons of said element and member.

6. The combination with two panels of safety glass so organized and arranged that one constitutes an approximate continuation of the other, each panel consisting of two glass layers bonded by an interlayer of synthetic resin projecting beyond the edges of the glass layers to form a mounting margin, said mounting margin having integral flanges projecting from opposite faces thereof to rest flush against and completely cover the edges of the glass layers and an integral head disposed along its outer edge portion to project laterally upon both sides of the mounting margin in spaced relationship to said flanges whereby to establish transversely aligned grooves on opposite faces of said margin, of a frame element and opposed clamping member adapted to span and clampingly engage between them the adjoining margins of said panels, each having lateral tenons at its edges to be seated in the grooves in corresponding faces of said margins and a longitudinal integral boss centrally disposed between and spaced from said tenons thereby creating a groove on each side of the boss for the reception of the heads aforesaid, and bolts piercing the bosses, the frame element and the clamping member for securing them one to the other and thereby clampingly engage the mounting margins of the panels between the tenons of said element and member, the overall thickness of the head of each mounting margin being less than the thickness of its panel whereby the outer faces of the frame element and clamping member will rest in the planes of the faces of the panels.

7. The combination with a pair of adjoining substantially coplanar panels, each consisting of two glass layers bonded to an interlayer of synthetic resin, said interlayer having a marginal extension projecting beyond the limits of the glass layers and transversely aligned grooves formed in the opposite faces thereof to create a flange upon each side of the marginal extension resting flush against and completely covering the adjacent edges of the glass layers and a laterally disposed head bordering the marginal extension, of a frame piece spanning said extensions on one side thereof and provided with tenons at its edges to be seated in the grooves of the extensions, a clamping member spanning said extensions in opposition to and coacting with said frame piece to engagingly clamp said marginal extensions, said member having tenons at its edges to be received in the grooves on the opposite side of said extensions, central bosses on said frame piece and on said clamping member disposed between the tenons of each and projecting between and resting flush against the opposed outer faces of the heads of the marginal extensions, and a fastening means passing through said bosses to secure the clamping member to said frame piece with the respective bosses thereof in substantial abutment.

PAUL PEVNEY.

REFERENCES CITED

The following references are of record in the file of this patent:

UNITED STATES PATENTS

| Number | Name | Date |
|---|---|---|
| 2,121,777 | Bailey | June 28, 1938 |
| 2,203,174 | Muttray | June 4, 1940 |
| 2,293,656 | McClain | Aug. 18, 1942 |
| 2,300,506 | Kamerer | Nov. 3, 1942 |
| 2,302,740 | Boicey | Nov. 24, 1942 |
| 2,303,151 | Watkins et al. | Nov. 24, 1942 |
| 2,363,164 | Waller | Nov. 21, 1944 |
| 2,374,056 | Watkins | Apr. 17, 1945 |
| 2,403,061 | Downes | July 2, 1946 |

FOREIGN PATENTS

| Number | Country | Date |
|---|---|---|
| 379,006 | Great Britain | Aug. 25, 1932 |
| 673,951 | Germany | Mar. 31, 1939 |

OTHER REFERENCES

"Product Engineering"—March 1940—pages 128 and 129.